United States Patent
Wang et al.

(10) Patent No.: US 9,686,589 B2
(45) Date of Patent: Jun. 20, 2017

(54) METHOD, DEVICE AND SYSTEM FOR IMPLEMENTING MULTI-PARTY CONFERENCE CALL BY USING SET TOP BOX

(71) Applicant: ZTE CORPORATION, Shenzhen, Guangdong Province (CN)

(72) Inventors: Jianchun Wang, Shenzhen (CN); Jidong Zhang, Shenzhen (CN); Liang Hou, Shenzhen (CN); Guangchao Liu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/394,190

(22) PCT Filed: Aug. 26, 2013

(86) PCT No.: PCT/CN2013/082240
§ 371 (c)(1),
(2) Date: Oct. 13, 2014

(87) PCT Pub. No.: WO2014/075483
PCT Pub. Date: May 22, 2014

(65) Prior Publication Data
US 2015/0078210 A1    Mar. 19, 2015

(30) Foreign Application Priority Data
Nov. 16, 2012    (CN) .......................... 2012 1 0465615

(51) Int. Cl.
*H04L 12/16*    (2006.01)
*H04Q 11/00*    (2006.01)
(Continued)

(52) U.S. Cl.
CPC ......... *H04N 21/4788* (2013.01); *H04L 12/18* (2013.01); *H04N 7/15* (2013.01)

(58) Field of Classification Search
CPC ...... H04N 21/4788; H04N 7/15; H04L 12/18; H04L 12/1822
See application file for complete search history.

(56) References Cited

U.S. PATENT DOCUMENTS

| 2006/0184624 A1* | 8/2006 | Thukral | H04N 7/15 709/204 |
| 2010/0226288 A1 | 9/2010 | Scott et al. | |
| 2012/0300015 A1* | 11/2012 | Chen | H04N 7/152 348/14.08 |

FOREIGN PATENT DOCUMENTS

| CN | 101453285 A | 6/2009 |
| CN | 101547335 A | 9/2009 |

(Continued)

OTHER PUBLICATIONS

Russian Office Action dated Apr. 6, 2015 in corresponding Russian application (No. 2014141583).

(Continued)

*Primary Examiner* — Lonnie Sweet
(74) *Attorney, Agent, or Firm* — McClure, Qualey & Rodack, LLP

(57) ABSTRACT

A method, device, and system for implementing a multi-party conference call by using a set-top box. The method includes: in a conferencing state, the set-top box sending a network server that manages the conference a request message for adding another specified set-top box into the conference where the set-top box is located; and after the set-top box receives an acknowledgment message fed back by the network server for indicating that the specified set-top box has joined in the conference, distributing audio and/or (Continued)

video signals to be transmitted by the set-top box to other members of the conference through the network server.

8 Claims, 4 Drawing Sheets

(51) Int. Cl.
*H04N 21/4788* (2011.01)
*H04N 7/15* (2006.01)
*H04L 12/18* (2006.01)

(56) References Cited

FOREIGN PATENT DOCUMENTS

| | | |
|---|---|---|
| CN | 102065269 A | 5/2011 |
| EP | 2296334 A1 | 3/2011 |

OTHER PUBLICATIONS

English translation of Russian Office Action dated Apr. 6, 2015 in corresponding Russian application (No. 2014141583).
EP Search Report dated Mar. 17, 2015.

* cited by examiner

METHOD, DEVICE AND SYSTEM FOR IMPLEMENTING MULTI-PARTY CONFERENCE CALL BY USING SET TOP BOX

TECHNICAL FIELD

The patent document relates to the field of multi-party call, and more particularly, to a method, device and system for implementing a multi-party conference call by using a set-top box.

BACKGROUND OF THE INVENTION

With the popularity of home digital televisions, the digital set-top box has become a digital device indispensable in every household. Today, in addition to the basic IPTV (Internet Protocol Television) function, the digital set-top box can also provide online games, both-party video calls, and other functions.

In the related art, the multi-party conference call is not universal, because every party involved in the conference call is often required to purchase a dedicated conference telephone for said multi-party conference call, and to connect the devices such as conference telephone, microphone and camera to dedicated servers with dedicated line, and the encoding and transmission of multi-channel video and audio streams are performed between the dedicated servers, whose cost is relatively high and which requires specialized technical knowledge.

To reduce the user expense and increase the popularity of multi-party conference calls, some software manufacturers add the function of multi-party conference call in the produced software, but such multi-party conference call is still limited by the popularity of the software.

If the set-top boxes that have already been commonly used by users can be used to realize the function of multi-party conference call, it is bound to bring commercial success for the multi-party conference call service.

SUMMARY OF THE INVENTION

The embodiment of the patent document provide a method, device and system for implementing a multi-party conference call by using a set-top box, to solve the technical problem about how to use a set-top box that has already been commonly used by users to achieve a function of multi-party conference call.

The embodiment of the patent document provides a method for a set-top box implementing a multi-party conference call, comprising:

in a conferencing state, the set-top box sending a network server that is used to manage a conference a request message for adding another specified set-top box into a conference where the set-top box is located; and after the set-top box receives an acknowledgement message fed back by said network server for indicating that said specified set-top box has joined the conference, distributing audio and/or video signals to be transmitted by said set-top box to other members of said conference via said network server.

Alternatively, said method further comprises:

when the set-top box is in a conferencing state, if the set-top box receives a notification message pushed by said network server for indicating that the set-top box is in a multi-party conferencing state, distributing the audio and/or video signals to be transmitted by the set-top box to members of said conference via said network server.

The embodiment of the patent document further provides a method for a network server processing a Multi-patty conference call of a set-top box, comprising: . . .

after the network server receives a request message sent by a set-top box for adding another specified set-top box into a conference where the set-top box is located, forwarding said request message to said specified set-top box;

after said network server receives a join-in conference acknowledgement message sent by said specified set-top box, adding said specified set-top box into recorded member information of said conference, and notifying said join-in conference acknowledgement message to said set-top box that sends said request message; and after said network server receives audio and/or video signals sent by said set-top box, converting said audio and/or video signals into multi-channel parallel signals and sending said multi-channel parallel signals to other members of said conference where said set-top box is located.

Alternatively, said method further comprises:

after said network server receives said join-in conference acknowledgement message sent by said specified set-top box, in addition to notifying said join-in conference acknowledgement message to said set-top box that sends said request message, the network server further pushing a notification message indicating that members are in a multi-party conferencing state to the members of said conference other than the set-top box that sends said request message.

The embodiment of the patent document further provides a method for a set-top box and a network server cooperating to implement a multi-party conference call, comprising:

said set-top box using the abovementioned method for a set-top box implementing a multi-party conference call;

said network server using the abovementioned method for a network server processing a multi-party call conferencing of a set-up box.

The embodiment of the patent document further provides a set-top box for implementing a multi-party conference call, comprising: a first multi-party conference message transmitting and receiving module, and an audio and video signal transmitting module, wherein, . . .

said first multi-party conference message transmitting and receiving module is configured to: exchange messages with a network server; when said set-top box is in a conferencing state, send a network server that manages a conference a request message for adding another specified set-top box into a conference where said set-top box is located, and receive a join-in conference acknowledgment message fed back by said network server for indicating that said specified set-top box has joined the conference; after receiving the join-in conference acknowledgment message, inform said audio and video signal transmitting module; after receiving a conferencing request message sent by said network server, send a join-in conference acknowledgement message to said network server; and said audio and video signal transmitting module is configured to: after receiving a notification from said first multi-party conference message transmitting and receiving module, when about to transmit audio and/or video signals, distribute to-be-transmitted audio and/or video signals through said network server to other members of said conference where said set-top box is located.

Alternatively, said first multi-party conference message transmitting and receiving module is further configured to: when said set-top box is in the conferencing state, receive a notification message pushed by said network server for indicating that said set-top box is in a multi-party conferencing state, and notify said audio and video signal transmitting module.

The embodiment of the patent document further provides a network server for implementing a multi-party conference call, comprising: a second multi-party conference message transmitting and receiving module, a conference information recording module and an audio and video signal distributing module, wherein . . .

said second multi-party conference message transmitting and receiving module is configured to: exchange messages with a set-top box; after receiving a request message sent by said set-top box for adding another specified set-top box into a conference where said set-top box is located, forward said request message to said specified set-top box; after receiving a join-in conference acknowledgement message sent by said specified set-top box, notify said join-in conference acknowledgement message to said set-top box that sends said request message as well as said conference information recording module;

said conference information recording module is configured to: after receiving a notification from said second multi-party conference message transmitting and receiving module, add said specified set-top box into recorded member information of said conference; and said audio and video signal distributing module is configured to: after receiving audio and/or video signals sent by said set-top box, search said conference information recording module for other members of the conference where said set-top box that transmits said audio and/or video signals is located, and convert said audio and/or video signals into multi-channel parallel signals and send multi-channel parallel signals to said other members.

Alternatively, said second multi-party conference message transmitting and receiving module is further configured to: after receiving the join-in conference acknowledgment message sent by said specified set-top box, push a notification message indicating that members are in a multi-party conferencing state to the members of said conference other than said set-top box that sends said request message.

The embodiment of the patent document further provides a system for implementing a multi-party conference call, comprising: a set-top box and a network server, wherein said set-top box adopting the abovementioned set-top box;

said network server adopting the abovementioned network server.

In the abovementioned technical solution in accordance with the embodiment of the patent document, the set-top box sends the to-be-transmitted conference content to a network server that establishes a call with each party in the multi-party conference, to overcome the shortcoming that the existing set-top box can establish a call with only one party, thus achieving a multi-party conference call.

PREFERRED EMBODIMENTS OF THE PATENT DOCUMENT

Hereinafter with reference to the accompanying figures, the embodiments of the patent document will be described in detail. It should be noted that, in the case of no conflict, the embodiments of the present application and the features in the embodiments may be arbitrarily combined with each other.

The conference mentioned in the present embodiment comprises at least two set-top boxes.

Figure 1:
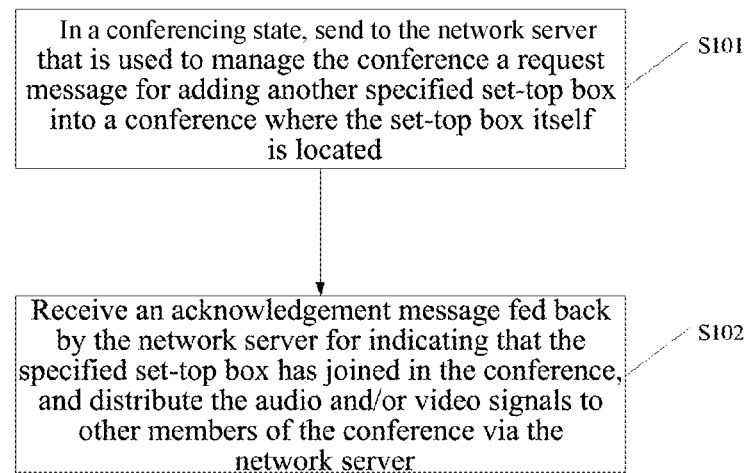
FIG. 1 is a flow chart of a method for implementing a multi-party conference call with a set-top box in accordance with an embodiment.

FIG. 1 is a flow chart of a method for implementing a multi-party conference call with a set-top box in accordance with the present embodiment, comprising the following steps.

Step S101, in a conferencing state, a request message is sent to the network server that is used to manage the conference for adding another specified set-top box into a conference where the set-top box itself is located.

Said another specified set-top box can reject the request message, at this time, the multi-party conference call fails;

the network server managing conferences is used to record created conferences, conference members of each conference and other information.

step S102, after receiving an acknowledgement message fed back by said network server for indicating that said specified set-top box has joined the conference, the audio and/or video signals to be transmitted by itself are distributed to other members of said conference via said network server.

The set-top box can acquire the abovementioned audio and/or video signals through a microphone and camera connected with itself; optional connection methods comprise: using a universal interface (such as USB (Universal Serial Bus) interface) for connection, or using a wireless interface (such as Bluetooth) for connection.

Said microphone may be a conventional microphone, or can also be integrated in said camera;

said camera can be an ordinary camera or a high-definition camera, it can be a camera integrated with a microphone, or a digital camera or digital camcorder supporting the real-time video output.

In other embodiments, if the network server managing conferences pushes a notification message indicating that said set-top box is in the multi-party conferencing state to the set-top box in the conferencing state, then the set-top box receiving said notification message also distributes the audio and/or video signals to be transmitted by itself to the members of said conference via the network server. The methods for indicating that the set-top box is in the multi-party conference comprise: indicating with a state flag, or indicating by informing said set-top box that a new member joins in its conference. Typically, the network server that manages the conference pushing a notification message to the set-top box to indicate that the set-top box is in a multi-party conferencing state usually happens, when the set-top box accepts a request forwarded by the network server indicating that another set-top box has joined in an existing conference, or a new set-top box joins in the conference where the set-top box is located.

Any set-top box participating in the conference can voluntarily withdraw from the conference, or the conference may also initiate to make a set-top box withdraw compulsively from a conference that said set-top box participates in; when a set-top box withdraws from the conference that it participates in, it needs to notify the network server, and the network server notifies other members of the conference about the withdrawal event, and re-notifies other members of the conference about their respective current multi-party conferencing states.

The messages for said set-top box to communicate with the network server can be the HTTP (Hyper Text Transport Protocol) messages.

Figure 2:
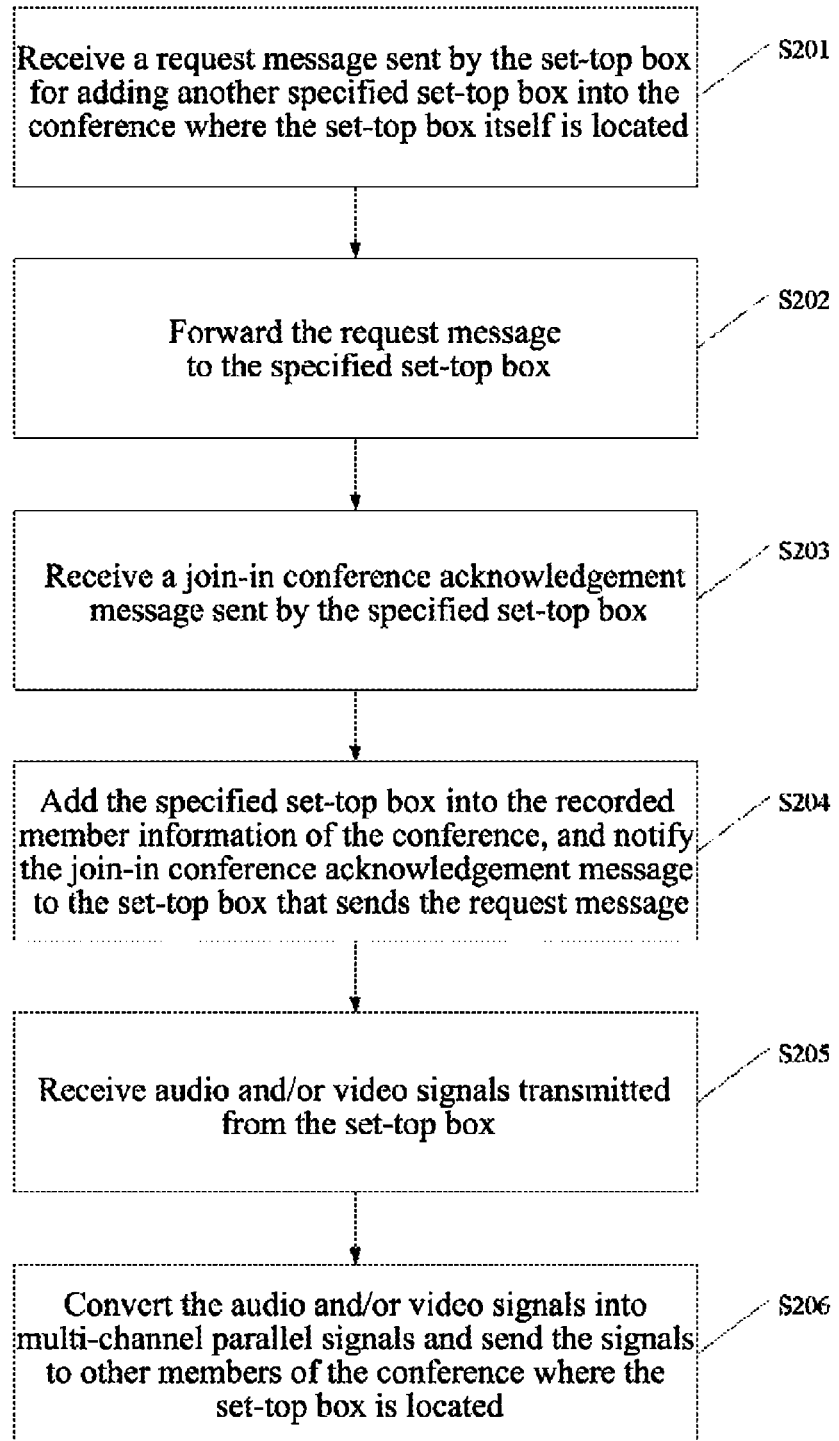
FIG. 2 is a flow chart of a method for a network server processing a multi-party conference call of a set-top box in accordance with an embodiment.

FIG. 2 is a flow chart of a method for a network server processing a multi-party conference call of a set-top box in accordance with the present embodiment, comprising the following steps.

Step S201, a request message sent by the set-top box for adding another specified set-top box into a conference where the set-top box is located is received.

Step S202, said request message is forwarded to said specified set-top box.

Step S203, a join-in conference acknowledgement message sent by said specified set-top box is received.

Step S204, said specified set-top box is added into the recorded member information of said conference, and said join-in conference acknowledgement message is notified to the set-top box that sends the request message.

In said step S204, the network server may also push a notification message indicating that members are in the multi-party conferencing state to the members of said conference other than the set-top box that sends the request message.

Step S205, audio and/or video signals transmitted from the set-top box are received.

Said audio and/or video signals can come from the set-top box that receives the join-in conference acknowledgement message, or the set-top box that receives said push message.

Step S206, said audio and/or video signals are converted into multi-channel parallel signals and the signals are sent to other members of the conference where said set-top box is located.

The messages used by said network server to communicate with said set-top box can be HTTP messages.

The embodiment of the patent document further provides a method for a set-top box and a network server working together to implement a multi-party conference call, in said method, the set-top box operates according to the flow chart of the abovementioned method for a set-top box implementing a multi-party conference call, and the network server operates according to procedures of the abovementioned method for a network server processing a multi-party conference call of a set-top box.

In the following, an application example is used to describe the abovementioned method for a set-top box and a network server working together to implement a multi-party conference call.

Figure 3:
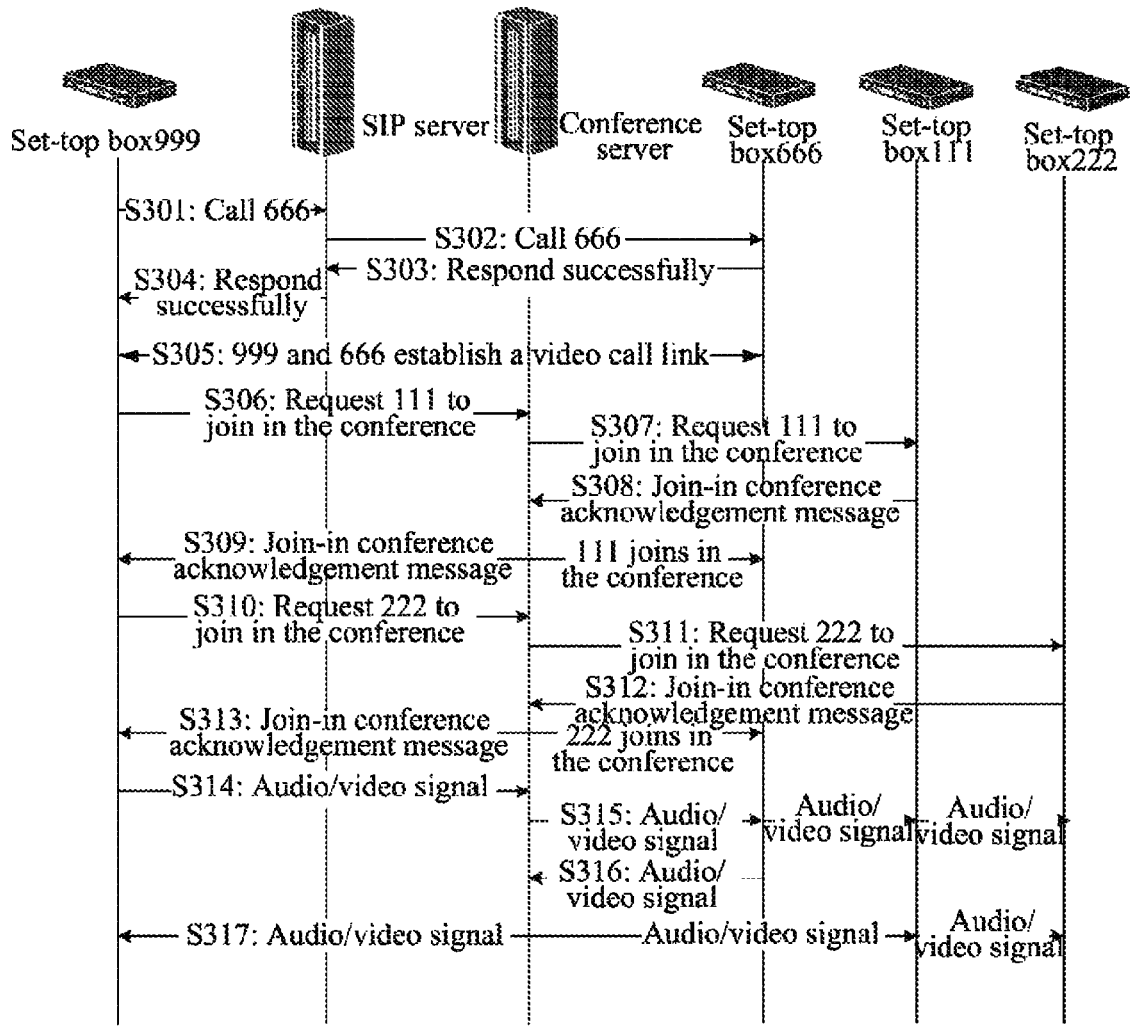
FIG. 3 is a signaling interaction diagram of using a set-top box to achieve a multi-party conference call in an application example.

In this application example, the set-top box 999 and set-top box 666 first create a conference to implement a two-party conference call; during the call, the set-top box 999 sends the network server a message to request adding set-top box 111 and set-top box 222 into the conference; after the set-top box 111 and set-top box 222 confirms to join in the conference, the set-top boxes 999, 666, 1111 and 222 perform a four-party conference call, the process is shown in FIG. 3, comprising the following steps:

Step S301, the set-top box 999 sends the SIP (Session Initiation Protocol) server a request for calling set-top box 666.

Step S302, the SIP server calls the set-top box 666.

Step S303, the set-top box 666 returns a successful response message to said SIP server.

Step S304, said SIP server forwards said successful response message to the set-top box 999.

Step S305, the set-top box 999 and set-top box 666 establish a conference call link and identify the conference as conference 1.

Step S306, the set-top box 999 sends a HTTP message to the network server and requests to add the set-top box 111 into the conference 1.

Step S307, the network server sends a join-in conference request to set-top box 111.

Step S308, the set-top box 111 returns a join-in conference acknowledgement message to the network server.

Step S309, the network server returns the join-in conference acknowledgement message to set-top box 999, meanwhile notifies the set-top box 666 that the set-top box 111 newly joins in the conference 1 where it is located.

Step S310, the set-top box 999 sends a HTTP message to the network server and requests to add the set-top box 222 into the conference 1.

Step S311, the network server sends a join-in conference request to set-top box 222.

Step S312, the set-top box 222 returns a join-in conference acknowledgement message to the network server.

Step S313, the network server returns the join-in conference acknowledgement message to set-top box 999, and meanwhile inform the set-top box 666 that the set-top box 222 newly joins in the conference 1 where it is located.

Step S314, the set-top box 999 sends audio and/or video signals to be transmitted in the conference 1 to the network server.

Step S315, the network server converts the audio and/or video signals into three-channel parallel signals and sends them to set-top boxes 666, 111 and 222.

Step S316, the set-top box 666 sends the audio and/or video signal to be transmitted in the conference 1 to the network server.

Step S317, the network server converts the audio and/or video signals into 3-channel parallel signals and sends them to set-top boxes 999, 111 and 222.

The embodiment of the patent document provides an embodiment of a set-top box that implements a multi-party conference call.

Said set-top box comprises a first multi-party conference message transmitting and receiving module and an audio and video signal transmitting module, wherein, said first multi-party conference message transmitting and receiving module is used to: exchange messages with the network server; when the set-top box is in a conferencing state, send a network server for managing conferences a request message for adding another specified set-top box into a conference where the set-top box itself is located, and receive a join-in conference acknowledgment message fed back by said network server for indicating that said specified set-top box has joined the conference; after receiving the join-in conference acknowledgment message, inform said audio and video signal transmitting module; and after receiving a conferencing request message sent by said network server, send a join-in conference acknowledgement message to said network server;

said first multi-party conference message transmitting and receiving module is further used to: after receiving a conference request message sent by said network server, send a join-in conference rejected message to the network server;

said first multi-party conference message transmitting and receiving module is further used to: when the set-top box is in the conferencing state, receive a notification message pushed by said network server for indicating that itself is in the multi-party conferencing state, and notify said audio and video signal transmitting module; and said audio and video signal transmitting module is used to: after receiving the notification message from said first multi-party conference message transmitting and receiving module, when about to transmit the audio and/or video signals, distribute to-be-transmitted audio and/or video signals through said network server to other members of the conference where said set-top box is located.

The embodiment of the patent document also provides an embodiment of a network server that implements a multi-party conference call.

Said network server comprises a second multi-party conference message transmitting and receiving module, a conference information recording module and an audio and video signal distributing module, wherein said second multi-party conference message transmitting and receiving module is used to: exchange messages with the set-top box; after receiving a request message sent by a set-top box to add another specified set-top box into a conference where it is located, forward said request message to said specified set-top box; after receiving a join-in conference acknowledgment message sent by said specified set-top box, notify said join-in conference acknowledgment message to the set-top box that sends said request message as well as the conference information recording module;

said second multi-party conference transmitting and receiving module is further used to: receive a join-in conference rejected message sent by said specified set-top box, and notify said join-in conference rejected message to the set-top box that sends the request message; and said second multi-party conference message transmitting and receiving module is further used to: after receiving the join-in conference acknowledgement message sent by said specified set-top box, push a notification message indicating that members are in the multi-party conferencing state to the members of said conference other than the set-top box that sends the request message.

Said conference information recording module is used to: after receiving a notification from said second multi-party conference message transmitting and receiving module, add said specified set-top box into recorded member information of said conference;

said audio and video signal distributing module is used to: after receiving the audio and/or video signals transmitted by the set-top box, search said conference information recording module for other members of the conference where the set-top box that sends said audio and/or video signals is located, convert said audio and/or video signals into multi-channel parallel signals and send them to said other members.

Figure 4:
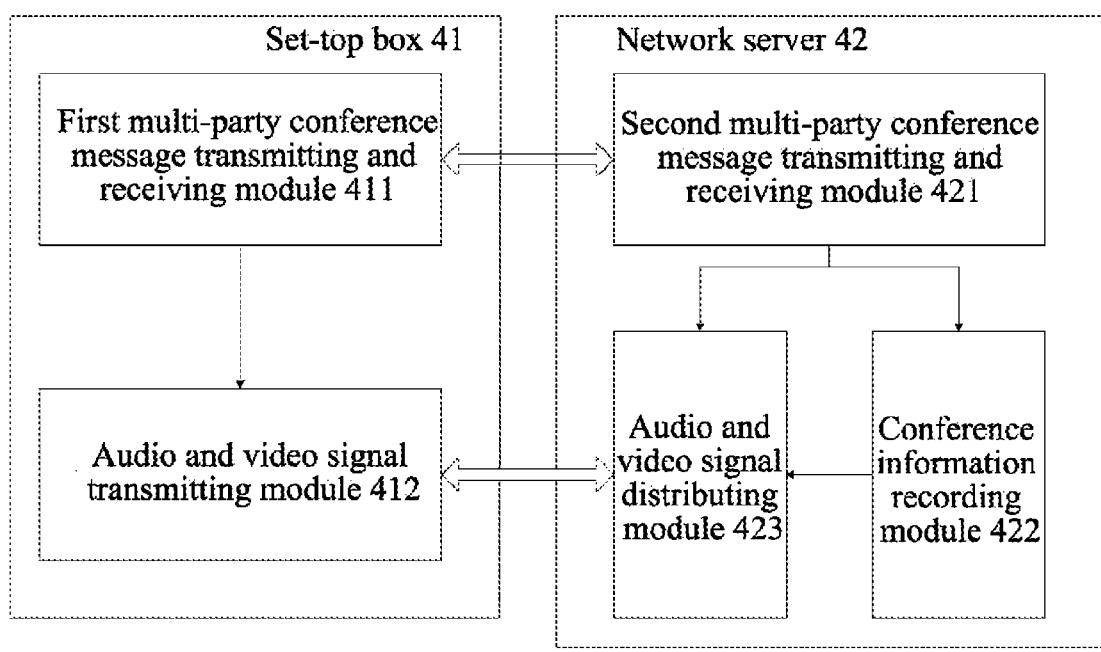
FIG. 4 is a composition diagram of a system for implementing a multi-party conference call in accordance with an embodiment.

FIG. 4 is a composition diagram of the system for implementing a multi-party conference call in accordance with the present embodiment.

Said system comprises a set-top box 41 and a network server 42, wherein, said set-top box adopts the abovementioned set-top box, comprising: a first multi-party conference message transmitting and receiving module 411, and an audio and video signal transmitting module 412;

said network server 42 adopts the abovementioned network server, comprising: a second multi-party conference message transmitting and receiving module 422, a conference information recording module 422, and an audio and video signal distributing module 423.

Those ordinarily skilled in the art can understand that all or some of steps of the abovementioned method may be completed by the programs instructing the relevant hardware, and said programs may be stored in a computer-readable storage medium, such as read only memory, magnetic or optical disk. Optionally, all or part of the steps of the abovementioned embodiments may also be implemented by using one or more integrated circuits. Accordingly, each module/unit in the above-mentioned embodiment may be realized in the form of hardware or software function module. The patent document is not limited to any specific form of hardware and software combinations.

It should be noted that the patent document may also have a variety of other embodiments, and without departing from the spirit and essence of the invention, a person skilled in the art may make various changes and modifications in accordance with the embodiments of the patent document, and these changes and modifications should belong to the protection scope of the appended claims of the patent document.

INDUSTRIAL APPLICABILITY

The technical solution in accordance with the embodiment of the patent document overcome the shortcoming that the existing set-top box can establish a call with only one party, thus achieving a multi-party conference call.

What we claim is:

1. A method for a set-top box implementing a multi-party conference call, comprising:
   in a conferencing state, a first set-top box sending to a network server that is used to manage a conference a request message for adding a second set-top box into a conference where the first set-top box is located;
   the first set-top box receiving an acknowledgement message fed back by said network server for indicating that said second set-top box has joined the conference;
   said first set-top box sending an HTTP message to said network server to request to add a third set-top box into the conference;
   said network sever sending a join-in conference request to said third set-top box;
   said third set-top box returning a join-in conference acknowledgement message to said network server;
   said network server returning the join-in conference acknowledgement message to said first set-top box, meanwhile notifying said second set-top box that said third set-top box newly joins in the conference where said second set-top box is located; and
   sending audio and/or video signals to be transmitted by said first set-top box to said network server which converts the audio and/or video signals into multiple-channel parallel signals and distributes the multiple-channel parallel signals to other members of said conference by HTTP connection.

2. The method of claim 1, further comprising:
   in the conferencing state, if another set-top box receives a notification message pushed by said network server for indicating that said another set-top box is in a multi-party conferencing state, also sending the audio and/or video signals to be transmitted by said another set-top box to said network server which converts the audio and/or video signals into multiple-channel parallel signals and distributes the multiple-channel parallel signals to members of said conference by HTTP connection.

3. A method for a network server processing a multi-party conference call of set-top boxes, comprising:

after the network server receives a request message sent by a first set-top box for adding a second set-top box into a conference where the first set-top box is located, forwarding said request message to said second set-top box;

said network server receiving a join-in conference acknowledgement message sent by said second set-top box, adding said second set-top box into recorded member information of said conference, and notifying said join-in conference acknowledgement message to said first set-top box that sends said request message;

said network server receiving an HTTP message sent by said first set-top box to request to add a third set-top box into the conference;

said network sever sending a join-in conference request to said third set-top box;

said network server receiving a join-in conference acknowledgement message returned by said third set-top box;

said network server returning the join-in conference acknowledgement message to said first set-top box, meanwhile notifying said second set-top box that said third set-top box newly joins in the conference where said second set-top box is located; and after said network server receives audio and/or video signals sent by said first set-top box, converting said audio and/or video signals into multi-channel parallel signals and distributing said multi-channel parallel signals to other members of said conference where said set-top box is located by HTTP connection.

4. The method of claim 3, further comprising:

after said network server receives said join-in conference acknowledgement message sent by said second set-top box, in addition to notifying said join-in conference acknowledgement message to said first set-top box that sends said request message, pushing a notification message to members of said conference other than the first set-top box that sends said request message, for indicating that the members are in a multi-party conferencing state.

5. A set-top box for implementing a multi-party conference call, comprising: a first multi-party conference message transmitting and receiving module, and an audio and video signal transmitting module, wherein, said first multi-party conference message transmitting and receiving module is configured to: exchange messages with a network server; when said set-top box is in a conferencing state, send to a network server that manages a conference a request message for adding a second set-top box into a conference where said set-top box is located, and receive a join-in conference acknowledgment message fed back by said network server for indicating that said second set-top box has joined the conference; after receiving a conferencing request message sent by said network server, send the join-in conference acknowledgement message to said network server;

said first multi-party conference message transmitting and receiving module is further configured to send an HTTP message to said network server to request to add a third set-top box into the conference; wherein said network sever sends a join-in conference request to said third set-top box, said third set-top box returns a join-in conference acknowledgement message to said network server, and said network server returns the join-in conference acknowledgement message to said first multi-party conference message transmitting and receiving module in said set-top box, meanwhile notifies said second set-top box that said third set-top box newly joins in the conference where said second set-top box is located;

said first multi-party conference message transmitting and receiving module is further configured to, after receiving the join-in conference acknowledgment message, notify said audio and video signal transmitting module; and said audio and video signal transmitting module is configured to: after receiving a notification from said first multi-party conference message transmitting and receiving module, when about to transmit audio and/or video signals, send to-be-transmitted audio and/or video signals to said network server which converts the audio and/or video signals into multiple-channel parallel signals and distributes the multiple-channel parallel signals to other members of said conference where said set-top box is located by HTTP connection.

6. The set-top box of claim 5, wherein, said first multi-party conference message transmitting and receiving module is further configured to: when said set-top box is in the conferencing state, receive a notification message pushed by said network server for indicating that said set-top box is in a multi-party conferencing state, and notify said audio and video signal transmitting module.

7. A network server for implementing a multi-party conference call, comprising: a second multi-party conference message transmitting and receiving module, a conference information recording module, an audio and video signal distributing module, and a processor, wherein, said second multi-party conference message transmitting and receiving module is implemented by the processor and configured to: exchange messages with a first set-top box; after receiving a request message sent by said first set-top box for adding a second set-top box into a conference where said first set-top box is located, forward said request message to said second set-top box; after receiving a join-in conference acknowledgement message sent by said second set-top box, notify said join-in conference acknowledgement message to said first set-top box that sends said request message as well as said conference information recording module;

said conference information recording module is implemented by the processor and configured to: after receiving the notification from said second multi-party conference message transmitting and receiving module, add said second set-top box into recorded member information of said conference;

said second multi-party conference message transmitting and receiving module is further configured to: receive an HTTP message sent by said first set-top box to request to add a third set-top box into the conference, send a join-in conference request to said third set-top box, and after said third set-top box returns a join-in conference acknowledgement message to said network server, notify the join-in conference acknowledgement message to said first set-top box as well as said conference information recording module, meanwhile notify said second set-top box that said third set-top box newly joins in the conference where said second set-top box is located;

said conference information recording module is further configured to: after receiving the notification from said second multi-party conference message transmitting and receiving module, add said third set-top box into the recorded member information of said conference;

said audio and video signal distributing module is implemented by the processor and configured to: after receiving audio and/or video signals sent by said first set-top box, search said conference information recording module for other members of the conference where said first set-top box that transmits said audio and/or video signals is located, and convert said audio and/or video signals into multi-channel parallel signals and distribute said multi-channel parallel signals to said other members by HTTP connection.

8. The network server of claim 7, wherein, said second multi-party conference message transmitting and receiving module is further configured to: after receiving the join-in conference acknowledgment message sent by said second set-top box, push a notification message to members of said conference other than said first set-top box that sends said request message, for indicating that the members are in a multi-party conferencing state.

\* \* \* \* \*